(12) United States Patent
Matsuoka et al.

(10) Patent No.: US 7,657,116 B2
(45) Date of Patent: Feb. 2, 2010

(54) CORRECTION METHOD OF DEFECTIVE PIXEL IN IMAGE PICKUP DEVICE AND IMAGE PROCESSING APPARATUS USING THE CORRECTION METHOD

(75) Inventors: Masaaki Matsuoka, Kanagawa (JP); Yoshiro Udagawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 427 days.

(21) Appl. No.: 10/955,446

(22) Filed: Sep. 30, 2004

(65) Prior Publication Data
US 2005/0078204 A1   Apr. 14, 2005

(30) Foreign Application Priority Data
Oct. 8, 2003 (JP) ............................... 2003-349594
Oct. 16, 2003 (JP) ............................... 2003-356442

(51) Int. Cl.
*H04N 9/64* (2006.01)
(52) U.S. Cl. .................. 382/274; 348/246; 348/247; 348/615; 358/400
(58) Field of Classification Search .................. 382/274; 358/400; 348/246, 247, 600
See application file for complete search history.

(56) References Cited

U.S. PATENT DOCUMENTS 5,047,861 A * 9/1991 Houchin et al. ............. 348/247

7,012,642 B1 * 3/2006 Zell ............................ 348/246
2002/0005904 A1 * 1/2002 Mendis ....................... 348/246

FOREIGN PATENT DOCUMENTS

JP            08-18873           1/1996

* cited by examiner

*Primary Examiner*—Charles Kim
*Assistant Examiner*—John W Lee
(74) *Attorney, Agent, or Firm*—Canon U.S.A. Inc., I.P. Division

(57) ABSTRACT

Location information representing the location of a defective pixel in an image pickup device and pixel defect level information representing the pixel defect level of the defective pixel are stored beforehand in a memory. The defect level of the defective pixel is determined after shipment of the image pickup device, and the pixel defect information is updated based on the defect determination result. If a new defective pixel is detected at a location different from the location of the defective pixel with the pixel defect information stored in the memory, the pixel defect information of that defective pixel is added. If a defective pixel is detected at the same location as the defective pixel with the pixel defect information stored in the memory, and if the defect level of the detected defective pixel is worse than the original defect level, the defect level of the defective pixel is updated.

9 Claims, 13 Drawing Sheets

FIG. 2

| ADDRESS | DATA | |
|---|---|---|
| 0x0000 | PIXEL DEFECT POSITION DATA | DEFECT LEVEL DATA |
| 0x0001 | | |
| 0x0002 | | |
| 0x0003 | | |
| 0x0004 | | |

FIG. 5B

PIXEL DEFECT DATA

```
(22,  0) (4)        (22,  0) (3) **
( 5,  1) (1)        ( 5,  1) (1)
( 2,  6) (5)  →  *  ( 8,  2) (0)
(13,  7) (2)  *     (10,  3) (1)
(17, 10) (3)        ( 2,  6) (3) **
( 2, 11) (6)        (13,  7) (2)
( 8, 12) (7)        (17, 10) (3)
                    ( 2, 11) (6)
                    ( 8, 12) (7)
```

PIXEL DEFECT LOCATION — DEFECT LEVEL

FIG. 5A

SENSOR IMAGE

FIG. 12

PIXEL DEFECT INFORMATION AT SHIPMENT

| NO. | COORDINATE X | COORDINATE Y | DEFECT LEVEL |
|---|---|---|---|
| 1 | 1000 | 600 | 12 |
| 2 | 800 | 400 | 10 |
| 3 | 400 | 200 | 8 |
| 4 | 200 | 100 | 3 |
| 5 | 1200 | 800 | 2 |
| 6 | | | |
| 7 | | | |
| 8 | | | |

FIG. 13

PIXEL DEFECT INFORMATION AT (FIRST) DETECTION OF PIXEL DEFECT

| NO. | COORDINATE X | COORDINATE Y | DEFECT LEVEL |
|---|---|---|---|
| 1 | 1000 | 600 | 12 |
| 2 | 800 | 400 | 10 |
| 3 | 400 | 200 | 8 |
| 4 * | 250 | 150 | 6 |
| 5 * | 600 | 500 | 5 |
| 6 * | 500 | 300 | 4 |
| 7 | 200 | 100 | 3 |
| 8 | 1200 | 800 | 2 |

FIG. 14

PIXEL DEFECT INFORMATION AT (SECOND) DETECTION OF PIXEL DEFECT

| NO. | COORDINATE X | COORDINATE Y | DEFECT LEVEL |
|---|---|---|---|
| 1 | 1000 | 600 | 12 |
| 2 | 800 | 400 | 10 |
| 3 | 400 | 200 | 8 |
| 4 ** | 250 | 150 | 7 |
| 5 * | 600 | 500 | 5 |
| 6 * | 500 | 300 | 4 |
| 7 | 200 | 100 | 3 |
| 8 ** | 900 | 700 | 3 |

FIG. 15

PIXEL DEFECT INFORMATION AT DETECTION OF PIXEL DEFECT

| NO. | COORDINATE X | COORDINATE Y | DATE OF DETECTION |
|---|---|---|---|
| 1 * | 1000 | 800 | 2002/1 |
| 2 | 500 | 400 | 2001/1 |
| 3 | | | |
| 4 | | | |
| 5 | | | |
| 6 | | | |
| 7 | | | |
| 8 | | | |

CORRECTION METHOD OF DEFECTIVE PIXEL IN IMAGE PICKUP DEVICE AND IMAGE PROCESSING APPARATUS USING THE CORRECTION METHOD

CROSS REFERENCE TO RELATED APPLICATIONS

This application claims priority from Japanese Patent Application Nos. 2003-356442 filed Oct. 16, 2003, and 2003-349594 filed Oct. 8, 2003, which are hereby incorporated by reference herein.

BACKGROUND OF THE INVENTION

1. Field of the Invention

The present invention relates to an image processing apparatus and an image processing method using an image pickup device, such as a charge-coupled device (CCD) and, in particular, to a pixel defect correction technique for the image pickup device.

2. Description of the Related Art

The importance of pixel defect correction in the image pickup device is mounting along with high-definition design implemented in the image pickup device for electronic still cameras or video cameras. A variety of techniques for correcting image degradation attributed to an image output from a defective pixel are known. Most of the known techniques correct a defective pixel based on pixel defect information (representing the location of and the defect level of a defective pixel) of the image pickup device collected before the shipment of the image pickup device.

The known techniques are unable to perform sufficient pixel defect correction because no defect information is updated concerning a defective pixel that has escaped detection performed before shipment and a defective pixel taking place as a result of aging.

Several techniques have been proposed to overcome this problem. For example, according to Japanese Patent Laid-Open No. 8-18873, a video camera has a defective pixel detection mode for detecting a defective pixel of an image pickup device. Defective pixel location data detected during the detection mode is compared with defective pixel location data stored in a memory, and information concerning a new defective pixel only is added to the memory for correction.

According to Japanese Patent Laid-Open No. 8-18873, if defective pixel location data detected during the detection mode matches defective pixel location data stored in the memory, no new defective pixel is added in the memory. No pixel defect level information updating is performed concerning a defective pixel that was detected at the shipment and further degraded in the pixel defect level subsequent to the shipment. Since the defective pixel detection is not performed with a desired pixel defect detection level range selected, pixel defect data more than necessary is collected, thereby consuming a large amount of memory space.

SUMMARY OF THE INVENTION

The present invention has been made in consideration of the above situation, and provides an image processing apparatus and an image processing method for correcting a degradation of a defective pixel contained in an image pickup device subsequent to the shipment thereof without increasing pixel defect data.

According to an aspect of the present invention, an image processing apparatus includes: a detecting device for detecting a defective pixel contained in an image pickup device including a plurality of pixels; and a memory device for storing separately second information relating to the defective pixel based on the result of detection of the detecting device in addition to first information stored beforehand and relating to a defective pixel in the image pickup device. The memory device stores, as the second information, the detection result of the detecting device relating to the same defective pixel if the defect level of the detection result of the detecting device is higher than the defect level represented by the first information relating to the same defective pixel in the image pickup device.

According to another aspect of the present invention, an image processing method includes: detecting a defective pixel contained in an image pickup device including a plurality of pixels; and storing separately second information relating to the defective pixel based on the result of detection in the detecting step in addition to first information stored beforehand and relating to a defective pixel in the image pickup device. The storing step includes storing, as the second information, the detection result of the detecting step relating to the same defective pixel if the defect level of the detection result of the detecting step is higher than the defect level represented by the first information relating to the same defective pixel in the image pickup device.

In accordance with the present invention, a pixel newly damaged is detected, and added to pixel defect data as a defective pixel. A defective pixel that has already been detected at the time of shipment and has been degraded further is updated in defect data, and correction is thus suitably performed. The present invention thus provides an image processing apparatus and an image processing method maintaining high quality of image for a long period of time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 illustrates a format of pixel defect data.

FIGS. 5A and 5B illustrate the operation of a pixel defect data updating circuit.

FIG. 12 illustrates pixel defect information at the shipment of the image pickup device.

FIG. 13 illustrates pixel defect information at a first detection of a defective pixel after the shipment.

FIG. 14 illustrates pixel defect information at a second detection of a defective pixel after the shipment.

FIG. 15 illustrates pixel defect information in accordance with another embodiment of the present invention.

DESCRIPTION OF THE EMBODIMENTS

Exemplary embodiments of the present invention will be described in detail in accordance with the accompanying drawings. However, the dimensions, materials, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
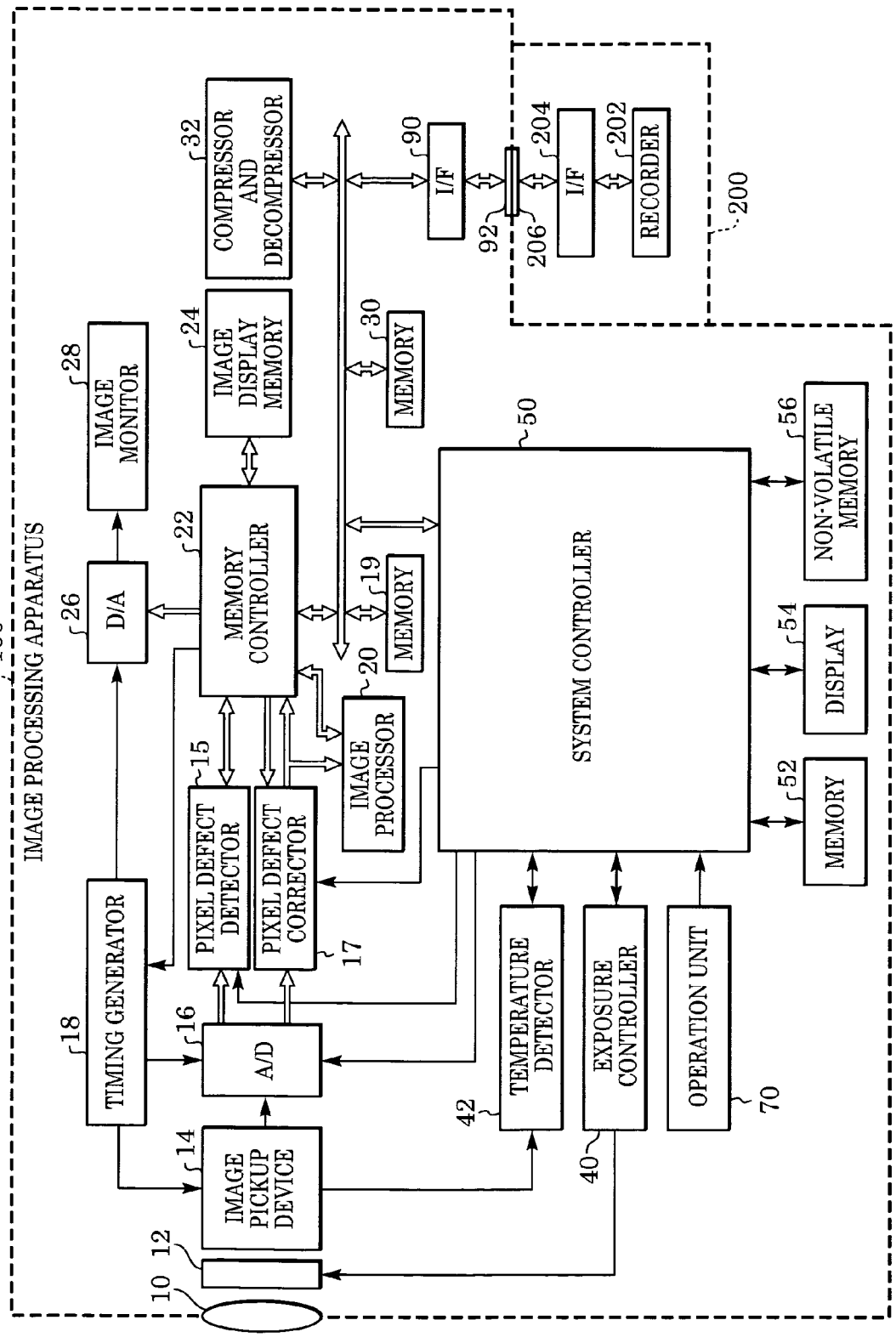
FIG. 1 is a block diagram of an image processing apparatus in accordance with one embodiment of the present invention.

FIG. 1 is a block diagram illustrating an image processing apparatus 100 having a pixel defect detection and correction function in accordance with a first embodiment of the present invention. The image processing apparatus 100 is an electronic still camera, an electronic video camera, or the like.

The image processing apparatus 100 includes an imaging lens 10, a shutter 12 having an aperture stop function, a image pickup device 14 for converting an optical image into an electrical signal, and an analog-to-digital (A/D) converter 16 for gain controlling an analog signal from the image pickup device 14 and then analog-to-digital converting the analog signal into a digital signal. By controlling gain, a system controller 50 substantially controls gain of the image processing apparatus 100. The image pickup device 14 includes a two-dimensional matrix of pixels, such as charge-coupled device (CCD) elements, and may contain a defective pixel.

Upon receiving an image signal output from the A/D converter 16, a pixel defect detector 15 detects degradation in the image signal due to the defective pixel. The input of the pixel defect detector 15 is not limited to the one from the A/D converter 16. Alternatively, the pixel defect detector 15 may receive an image signal from a memory 30 via a memory controller 22.

A pixel defect corrector 17 corrects the image signal degradation due to the defective pixel in response to the input of the image signal from the A/D converter 16. The input of the pixel defect corrector 17 is not limited to the one from the A/D converter 16. Alternatively, the pixel defect corrector 17 may receive the image signal from the memory 30 via the memory controller 22. The pixel defect corrector 17 performs a pixel defect correction process on the image signal based on pixel defect data at the shipment of the apparatus or updated pixel defect data output from the pixel defect detector 15.

A timing generator 18 supplies the A/D converter 16 and a digital-to-analog (D/A) converter 26 with a clock signal and a control signal, and is controlled by the memory controller 22 and the system controller 50. Also included in the image processing apparatus 100 are a memory 19 for holding information of a defective pixel and an image processor 20. The image processor 20 performs a predetermined pixel interpolation process and a color conversion process on data from the pixel defect corrector 17 or on data from the memory controller 22.

The memory controller 22 controls the A/D converter 16, the pixel defect corrector 17, the timing generator 18, the memory 19, the image processor 20, an image display memory 24, the D/A converter 26, the memory 30, and a compressor and decompressor 32. The data of the pixel defect corrector 17 is written onto the image display memory 24 or the memory 30 through the image processor 20 and the memory controller 22. The data of the A/D converter 16 is written onto the image display memory 24 or the memory 30 through the memory controller 22.

Also included in the image processing apparatus 100 are the image display memory 24, the D/A converter 26, and an image monitor 28 including a thin-film transistor liquid-crystal display (TFT LCD). The image data written on the image display memory 24 is displayed on the image monitor 28 via the D/A converter 26. The image monitor 28 successively displays captured image data, thereby performing the function of an electronic viewfinder.

The memory 30 stores a still image and/or a moving image, and has sufficient storage capacity to store a predetermined number of still images and a moving image for a predetermined period of time. The memory 30 may serve as a working area of the system controller 50.

The compressor and decompressor unit 32 compresses and/or decompresses image data in accordance with adaptive discrete sine/cosine transformation (ADCT). The compressor and decompressor unit 32 reads an image stored in the memory 30 and compresses and/or decompresses the read image. The processed data is then written back on the memory 30. An exposure controller 40 controls the shutter 12 having the aperture stop function. The system controller 50 controls the exposure controller 40 using a through-the-lens (TTL) method. More specifically, the system controller 50 controls the exposure controller 40 in accordance with the result of calculation of the image processor 20 that has performed a calculation process on the captured image data.

A temperature detector 42 detects the temperature of the image pickup device 14 using a temperature sensor. The system controller 50 generally controls the image processing apparatus 100. A memory 52 stores constants, variables, programs, etc. for the operation of the system controller 50.

A display 54 may be a liquid-crystal display or a display device including a loudspeaker. The display 54 displays an operational status, messages, etc, using characters, images, or sound as the system controller 50 executes the program thereof. A single or a plurality of displays 54 are installed near an operation unit 70 of the image processing apparatus 100 at a place that presents a clear view of the screen of the display 54. The display 54 may be a combination of an LCD or light-emitting diode (LED) and a voice synthesizer.

A non-volatile memory 56 is an electrically erasable and programmable non-volatile memory, such as an EEPROM (electrically erasable programmable read-only memory), for example. The non-volatile memory 56 stores pixel defect information including pixel defect location information and defect level information of a defective pixel of the image pickup device 14 before the shipment thereof. In operation of the image processing apparatus 100, the data of the non-volatile memory 56 is loaded to the memory 19, and at the end of the operation, the date of the memory 19 is evacuated to the non-volatile memory 56.

Also included in the image processing apparatus 100 are an operation unit 70 including a variety of buttons, and a touch panel, an interface (I/F) 90 for performing an interfacing function with a recording medium, such as a memory card and/or a hard disk, and a connector 92 for making connections with the recording medium, such as the memory card and/or the hard disk. The interface 90 and the connector 92 comply with specifications of PCMCIA cards (Personal Computer Memory Card International Association cards, also called PC Cards), Compact Flash® (CF) cards, etc.

A recording drive 200 is for use with the memory card, the hard disk, etc. The recording drive 200 includes a recorder 202, such as a semiconductor memory, a magnetic disk, or the like, an interface (I/F) 204, and a connector 206 for connection with the image processing apparatus 100 via connector 92.

FIG. 2 illustrates a format of pixel defect data in accordance with the first embodiment of the present invention. The pixel defect location data indicating the location of a defective pixel and the defect level data indicating the degree of the defective pixel in the image pickup device 14 are stored in pair. To correct the defective pixel, a defect level to be corrected is determined based on the temperature, shutter speed, and effective gain of the image pickup device 14. The pixel defect corrector 17 selectively reads the pixel defect level data held in the memory in the format shown in FIG. 2 for correction.

The pixel defect detector 15 receives, through the A/D converter 16, a pixel defect detection image signal output from the image pickup device 14 with the shutter 12 closed (or a pixel defect detection image signal from the memory 30 that was stored beforehand from the output from the A/D converter 16), and detects a defective pixel. The pixel defect detector 15 also reads pixel defect data from the memory 19, and writes the pixel defect data of the detected defective pixel in the format of FIG. 2. The updating of the pixel defect data of the image pickup device 14 is discussed later in detail.

Figure 3:
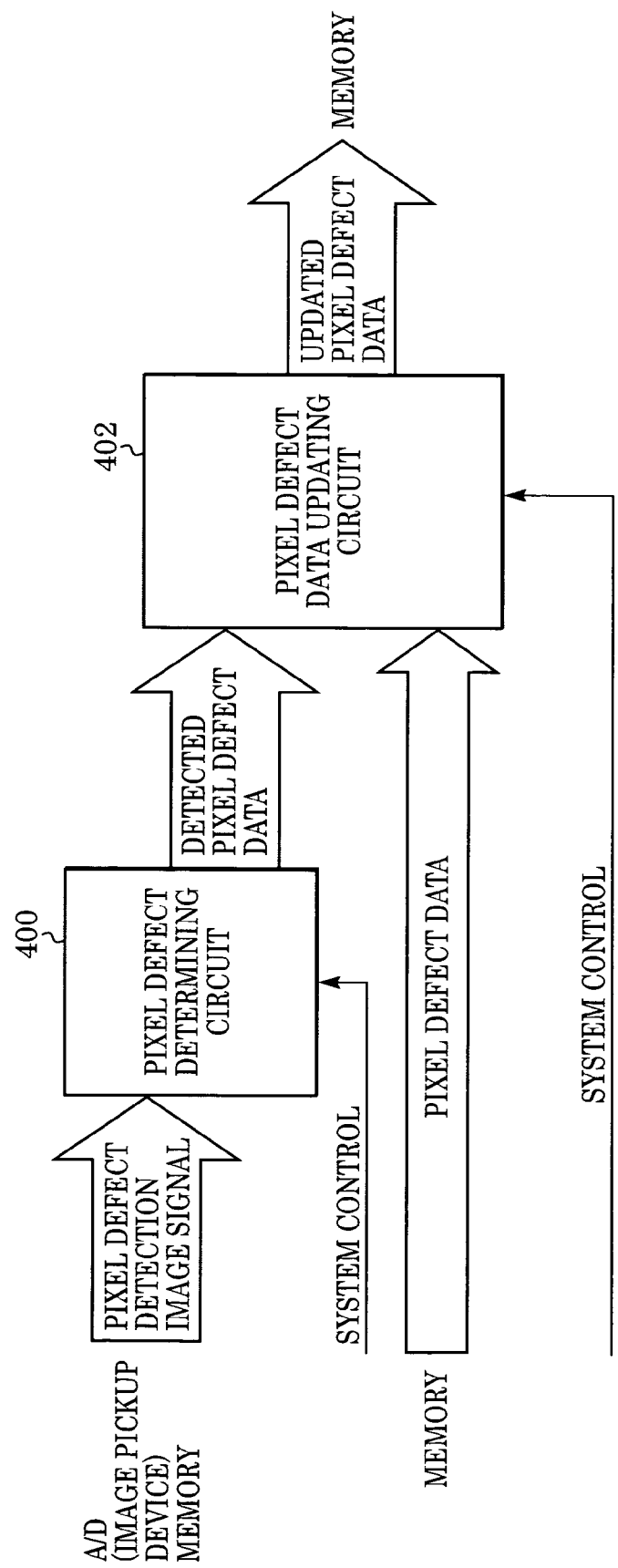
FIG. 3 is a block diagram of a pixel defect detector.

FIG. 3 is a block diagram illustrating the internal structure of the pixel defect detector 15. A pixel defect determining circuit 400 detects the defective pixel from the pixel defect detection image signal from the image pickup device 14 and determines the defect level of the defective pixel, and output the pixel defect data containing location information and defect level of the detected defective pixel. A pixel defect data updating circuit 402 receives original pixel defect data from the memory, and updates the pixel defect data.

The pixel defect detection and defect level determination operation of the pixel defect determining circuit 400 is described below with reference to FIG. 4. The pixel defect determining circuit 400 receives defect level ranks R0, R1, R3, . . . , Rm (m is a positive integer) from the system controller 50. The defect level ranks R0, R1, R3, . . . , Rm are determined by pixel defect determining threshold values L0, L1, L2, L3, . . . , Ln (n is a positive integer), temperature, shutter speed (exposure time), and effective gain. In the first embodiment, the more likely the defective pixels take place, the larger the defect level rank. Generally, the defective pixels take place more likely as the temperature rises higher, or the shutter speed becomes slower, or the effective gain becomes higher.

The pixel defect determining circuit 400 detects a differential signal between the pixel defect detection image signal from the image pickup device 14 (or the memory 30) and the pixel defect detection image signal that has undergone an appropriate filtering process, detects a defective pixel in response to the differential signal, and outputs defective pixel location data and defect level data. In the filtering process, a linear interpolation process is performed using one of a first order filter and a second order filter to cause a signal value of a defective pixel to stand out clearly with respect to a signal value of a normal pixel, in other words, to stress the irregularity in the signal value of the defective pixel.

Figure 4:
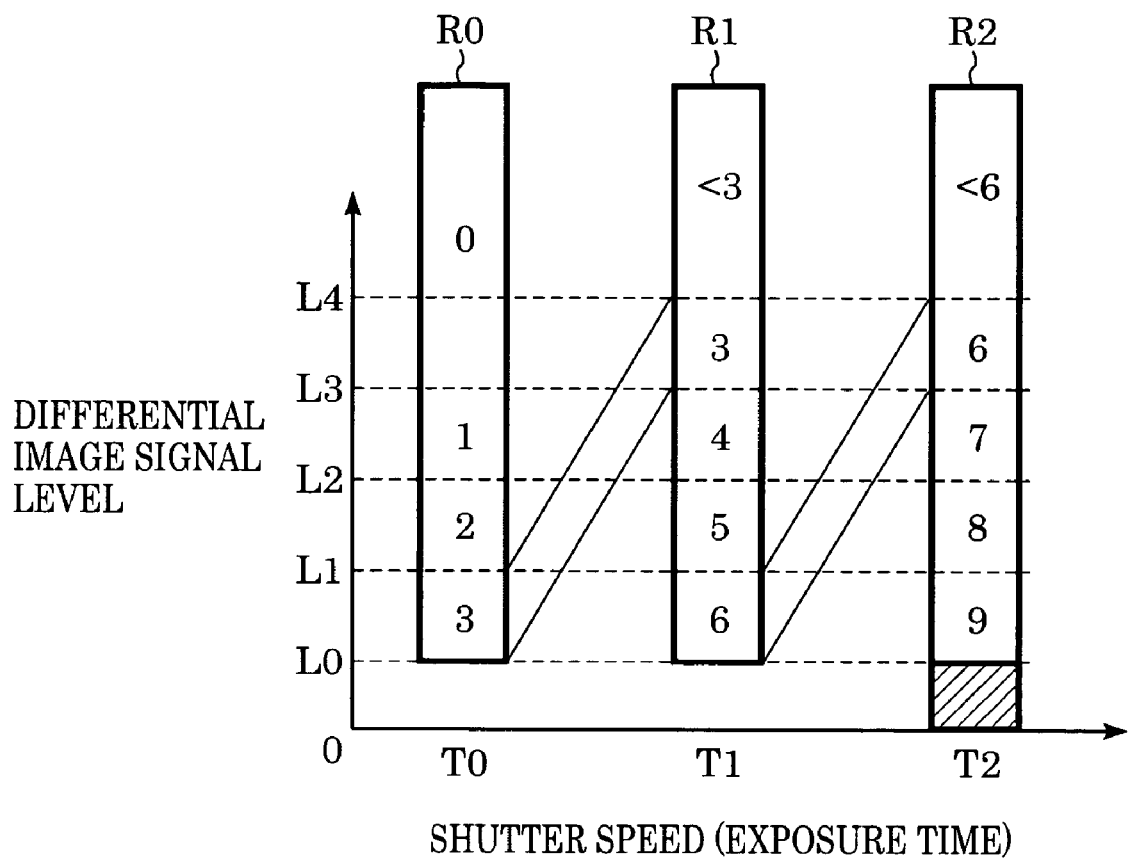
FIG. 4 illustrates the operation of a pixel defect determining circuit.

With n=4 (differential image signal level threshold) and m=2 (defect level rank) as shown in FIG. 4, defect level values 0-9 are assigned to defective pixels. The smaller the defect level value, the worse defect the defective pixel has. To simplify explanation, the effective gain is controlled with respect to temperature from the temperature detector 42 so that the defect level rank is controlled by the shutter speed (T0, T1, and T2) only. As shown in FIG. 4, the shutter speed becomes slower with the subindex thereof becoming larger. The defect level rank is controlled by the shutter speed (exposure time) only. Alternatively, the defect level rank is controlled by the temperature, the shutter speed (exposure time), and the effective gain.

As will be discussed later, the pixel defect determining circuit 400 assigns the defect level to each defective pixel based on the differential signal level and the differential image signal level thresholds shown in FIG. 4, and outputs the defect level together with the defective pixel location. More specifically, a defective pixel low in a differential image signal level with a slow shutter speed is assigned a modest defect level, while a defective pixel high in a differential image signal level with a fast shutter speed is assigned a worse defect level, and the assigned defect level is output together with the defective pixel location data. Pixels present within a hatched area of FIG. 4, lower than a differential signal level threshold L0, is determined to be a normal pixel.

The operation of the pixel defect data updating circuit 402 is described below with reference to FIGS. 5A and 5B. The pixel defect data updating circuit 402 compares detected pixel defect data from the pixel defect determining circuit 400 with the pixel defect data stored beforehand in the memory 19, and updates the pixel defect data. FIG. 5A illustrates a sensor image. As shown, a number in a circle represents a defective pixel already detected at the time of the shipment of the image processing apparatus 100, and a number not in a circle represents a defective pixel detected during a pixel defect detection mode. The number itself represents the defect level of the corresponding defect. If a number is annotated with an asterisk symbol (*), the corresponding pixel is newly detected as a defective pixel. If a number is annotated with double asterisk symbols (**), the corresponding pixel is already detected at the time of the shipment and has degraded even further thereafter.

More specifically, if the pixel defect location of the detected defective pixel fails to match the pixel defect location in the pixel defect data stored beforehand in the memory 19, the pixel defect data of the detected defective pixel is added. The pixels at locations (8, 2) and (10, 3) shown in FIGS. 5A and 5B are those defective pixels. If the pixel defect location of the detected defective pixel matches the pixel defect location in the pixel defect data stored beforehand in the memory 19, the defect level of the detected defective pixel is compared with the original defect level. If the defect level of the detected defective pixel is worse than the original defect level, the original pixel defect data is updated. The pixels at locations (22, 0) and (2, 6) are those pixels.

If the pixel defect location of the detected defective pixel matches the pixel defect location in the pixel defect data stored beforehand in the memory 19, and if the defect level of the detected defective pixel matches the original defect level, no pixel defect data is updated. The pixels at locations (5, 1), (13, 7), (17, 10) shown in FIGS. 5A and 5B are those pixels. If the original defect level is worse than the defect level of the detected defective pixel, the original defect data is not updated. If any defective pixel in the pixel defect data stored in the memory 19 is not detected, the pixel defect data is not updated. The pixels at locations (2, 11) and (8, 12) shown in FIGS. 5A and 5B are those pixels.

Figure 6:
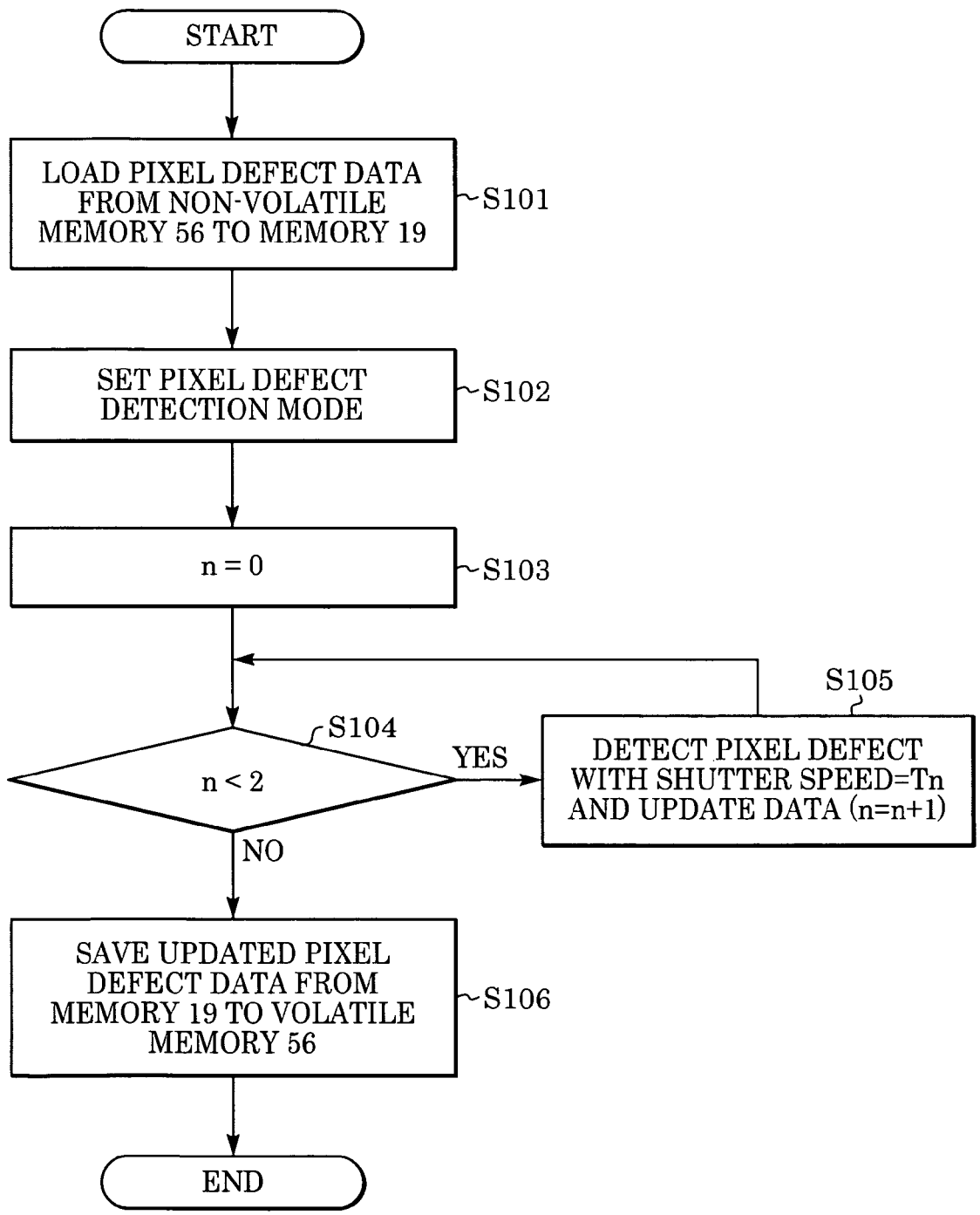
FIG. 6 is a flowchart illustrating a pixel defect detection operation of a system controller.

FIG. 6 is a flowchart of the pixel defect detection operation of the system controller 50. The process of FIG. 6 is performed when a user operates the operation unit 70 in the image processing apparatus 100 to detect a defective pixel. The pixel defect determination threshold value, defect level range, and a defect level determined by those factors are shown in FIG. 4.

As shown in FIG. 6, the system controller 50 loads the pixel defect data already acquired from the non-volatile memory 56 to the memory 19 (step S101). The system controller 50 enters a variety of settings during the pixel defect detection mode (step S102). More specifically, in step S102, the system controller 50 acquires temperature data of the image pickup device 14 from the temperature detector 42 to control the effective gain of the image pickup device 14, controls the exposure controller 40 to activate a pixel defect detection image capturing mode with the shutter 12 closed, and sets the pixel defect determining threshold and the defect level range in the pixel defect determining circuit 400.

The system controller 50 detects the defective pixel with the shutter speeds of T0 to T2 (steps S103 through S105). First, the shutter speed (exposure time) is set to T0 (n=0 in FIG. 6) (step S103). In step S104, the system controller 50 determines whether n<2. If n<2, processing proceeds to step S105, and if n≧2, processing proceeds to step S106.

In step S105, the pixel defect determining circuit 400 acquires, from the system controller 50, the pixel defect determining threshold values L0, L1, L2, and L4, and the defect level rank R0 of FIG. 4 corresponding to the shutter speed (exposure time) T0. As previously discussed, the pixel defect determining circuit 400 detects a differential signal between the pixel defect detection image signal from the image pickup device 14 (or the memory 30) and the pixel defect detection image signal that has undergone an appropriate filtering process, detects a defective pixel in response to the differential signal level and the threshold value at the defect level rank R0, determines the defect level of the defective pixel, and outputs the defect level together with the pixel defect location information (step S105). The pixel defect data updating circuit 402 compares the detected pixel defect data from the pixel defect determining circuit 400 with the pixel defect data stored beforehand in the memory 19, updates the pixel defect data in a manner already discussed with reference to FIG. 5, and writes the result updated pixel defect data in the memory 19 (step S105).

When the pixel defect detection is performed at the shutter speed of T0, the pixel defect detection is successively repeated with the shutter speeds of T1 and then T2. When the pixel defect detection is completed (n=2), processing proceeds to step S106 where the updated pixel defect data is retrieved from the memory 19 to the non-volatile memory 56 for storage, and processing then ends.

Figure 7:
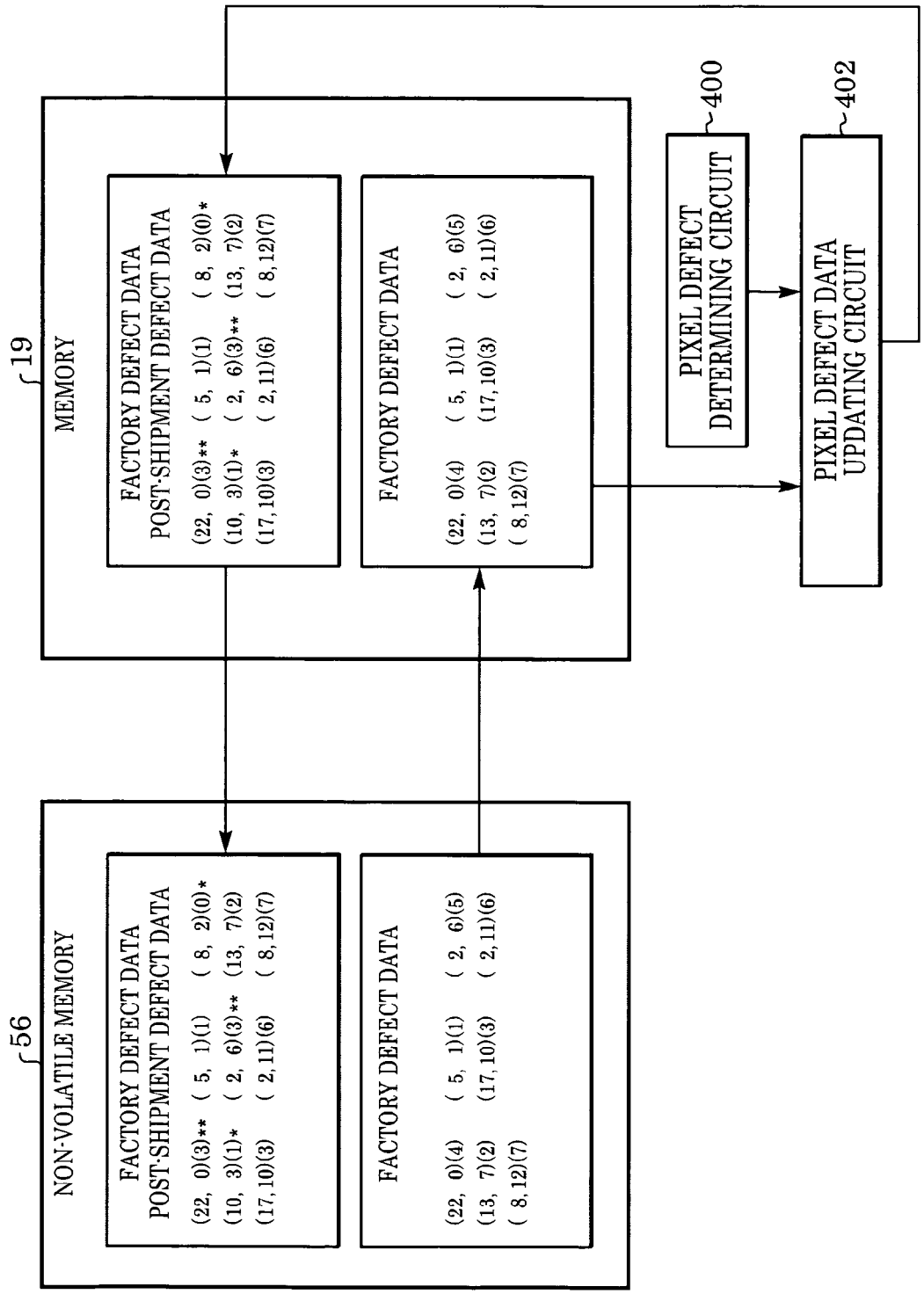
FIG. 7 illustrates the state of a non-volatile memory and a memory in accordance with a first embodiment of the present invention.

FIG. 7 illustrates data that is expanded or stored in the non-volatile memory 56 or the memory 19 when the system controller 50 executes the process of the flowchart of FIG. 6.

In step S101, factory defect data collected at the shipment of the image processing apparatus 100 is expanded on the memory 19 from the non-volatile memory 56. In steps S102-S105, the factory defect data updated with post-shipment defect data is expanded on the memory 19. In step S106, the factory defect data updated with the post-shipment defect data is stored back from the memory 19 to the non-volatile memory 56.

In accordance with the first embodiment, a defective pixel that has occurred since the shipment of the image processing apparatus 100 is detected, and the pixel defect data thereof is added to the original pixel defect data. A defective pixel already detected at the shipment can be worsened in the defect level subsequent to the shipment. The defect level of such a defective pixel is updated accordingly. Since correction is performed on these defective pixels, excellent image quality of the image processing apparatus 100 is maintained for a long period of time. With an appropriate pixel defect determining threshold value and an appropriate defect level rank set, the pixel defect detection process is performed with a defect level of a defective pixel selected. This arrangement shortens defect level determination process time, and prevents a large increase in the pixel defect data.

Second Embodiment

A second embodiment of the present invention is identical in structure to the first embodiment of the present invention. The operation of the pixel defect data updating circuit 402 in the second embodiment is described with reference to FIG. 8 and the sensor image of FIG. 5. The pixel defect data updating circuit 402 of the second embodiment has two operation modes. During a first operation mode, the pixel defect data updating circuit 402 operates in the same manner as in the first embodiment of the present invention.

A second operation mode of the pixel defect data updating circuit 402 is discussed below. The pixel defect data updating circuit 402 compares the detected pixel defect data from the pixel defect determining circuit 400 with the pixel defect data stored beforehand in the memory 19 to update the pixel defect data. As shown in FIG. 5, a number in a circle represents a defective pixel already detected at the time of the shipment of the image processing apparatus 100, and a number not in a circle represents a defective pixel detected during a pixel defect detection mode.

If the pixel defect location of the detected defective pixel fails to match the pixel defect location in the pixel defect data stored beforehand in the memory 19, the pixel defect data of the detected defective pixel is added. The pixels at locations (8, 2) and (10, 3) shown in FIGS. 5A and 5B are those defective pixels. If the pixel defect location of the detected defective pixel matches the pixel defect location in the pixel defect data stored beforehand in the memory 19, the defect level of the detected defective pixel is compared with the original defect level. If the defect level of the detected defective pixel is worse than the original defect level, the pixel defect data is updated. The pixels at locations (22, 0) and (2, 6) are those pixels.

If the pixel defect location of the detected defective pixel matches the pixel defect location in the pixel defect data stored beforehand in the memory 19, and if the defect level of the detected defective pixel matches the original defect level, the pixel defect data is not output. The pixels at locations (5, 1), (13, 7), and (17, 10) in FIGS. 5A and 5B are those pixels. If the original defect level is worse than the defect level of the detected defective pixel, the pixel defect data is not output. If any defective pixel in the pixel defect data stored in the memory 19 is not detected, the pixel defect data of that defective pixel is not output. The pixels at locations (2, 11) and (8, 12) shown in FIGS. 5A and 5B are those pixels.

Figure 8:
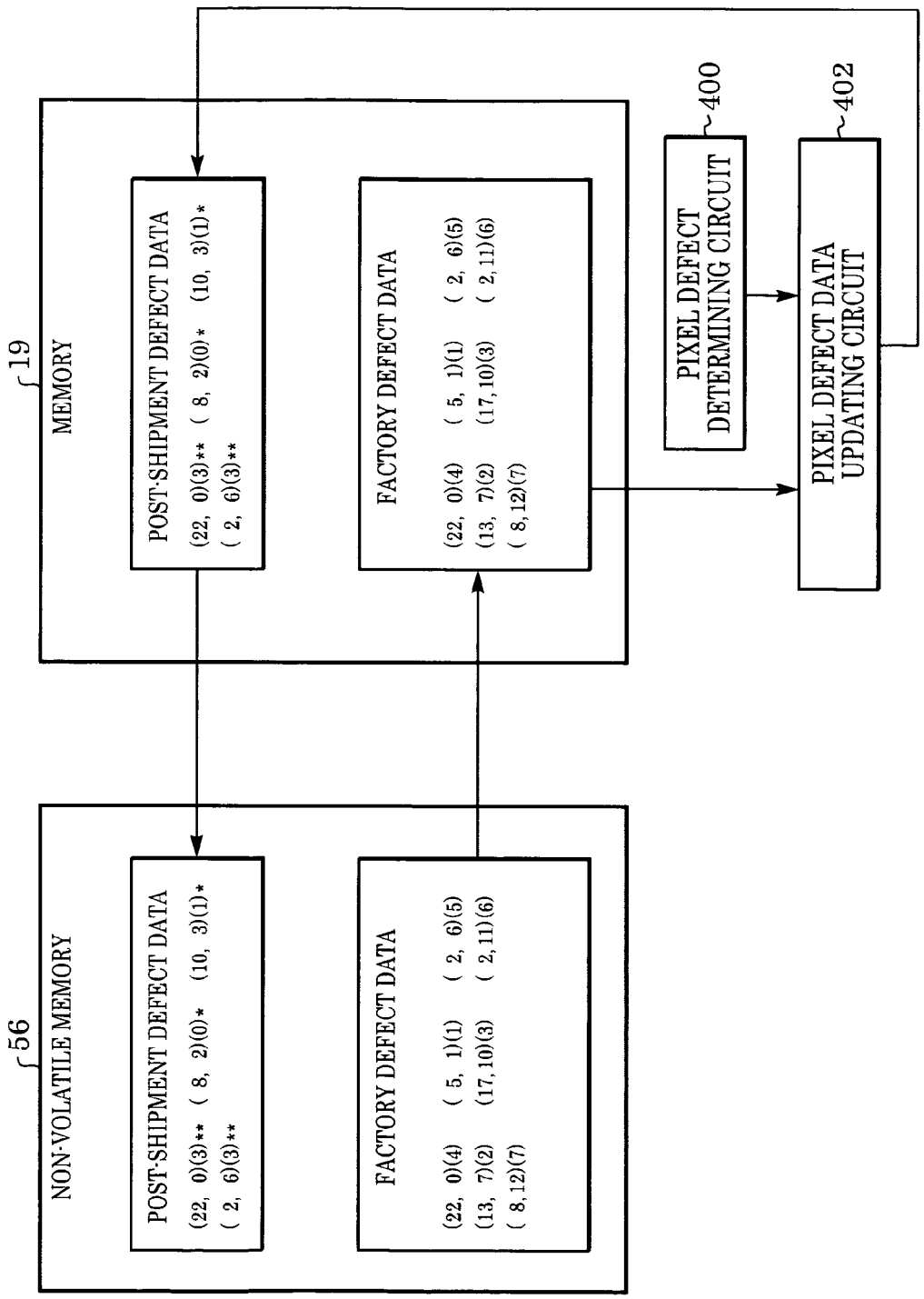
FIG. 8 illustrates the state of a non-volatile memory and a memory in accordance with a second embodiment of the present invention.

FIG. 8 illustrates data that is expanded or stored in the non-volatile memory 56 and the memory 19 when the system controller 50 executes the process of the flowchart of FIG. 6.

In step S101, the factory defect data is expanded from the non-volatile memory 56 to the memory 19. In steps S102-S105, the post-shipment defect data is expanded onto the memory 19. In step S106, the post-shipment defect data is stored from the memory 19 to the non-volatile memory 56. If the post-shipment defect data is destroyed with the process suspended in the middle thereof, a correction operation is performed on the defective pixel using the factory defect data. When the defect level is acquired together with the pixel defect location information, it takes time to fully obtain the pixel defect data. The pixel defect data can be destroyed in the course of the process, the collection operation of the post-shipment defect data can be suspended by an operation of the user, or the collection operation of the pixel defect data can be unsuccessful. Even in such a case, the correction process is performed to some degree using the factory defect data.

Figure 10:
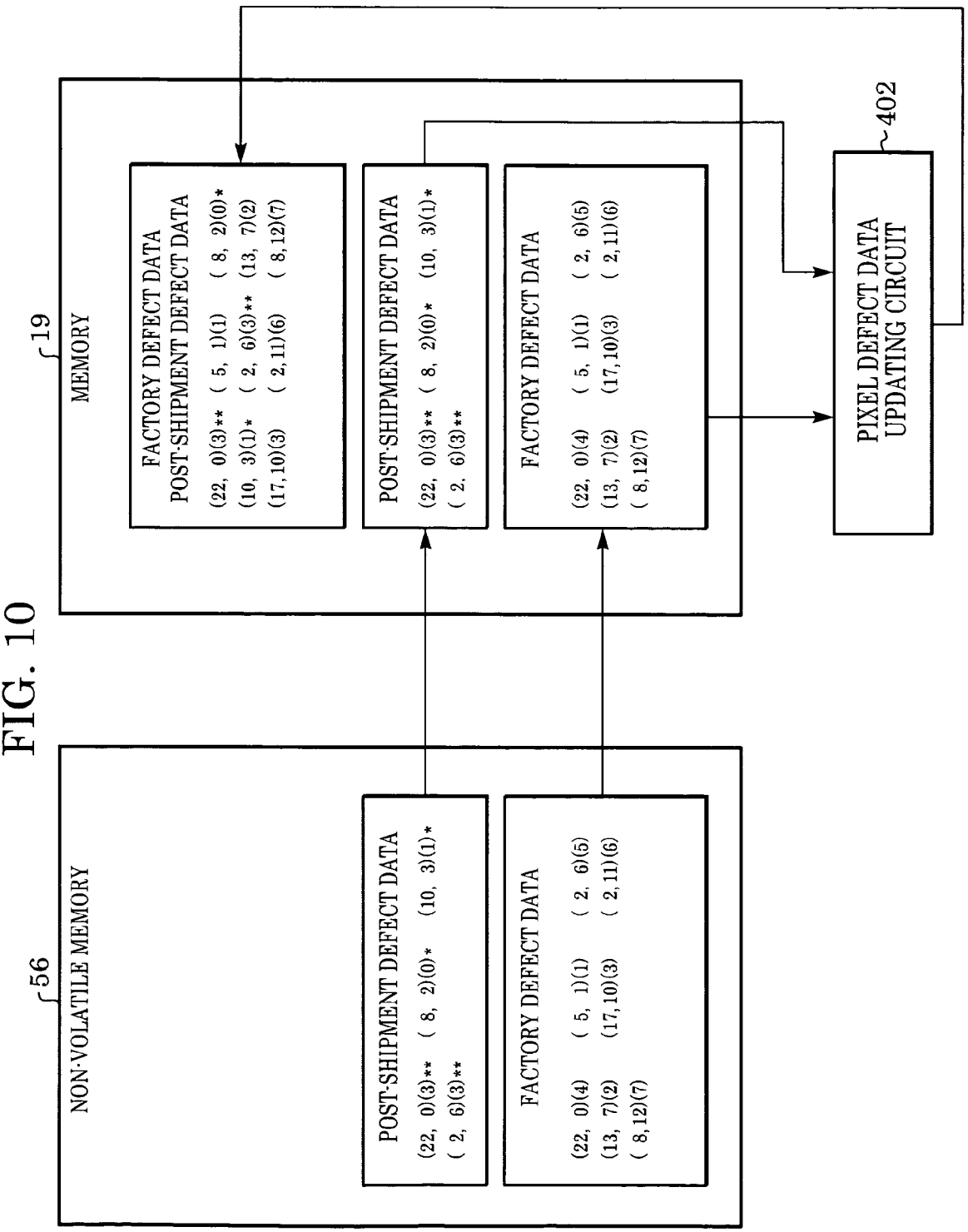
FIG. 10 illustrates the state of the non-volatile memory and the memory in accordance with the second embodiment of the present invention.

FIG. 10 illustrates data that is expanded in the memory 19 when the pixel defect data is prepared immediately prior to the correction process. The factory defect data and the post-shipment defect data are expanded into the memory 19 from the non-volatile memory 56. The pixel defect data updating circuit 402 reads the expanded factory defect data and post-shipment defect data from the memory 19, and in the first operation mode, generates the factory defect data updated with the post-shipment defect data, expands the updated factory defect data in the memory 19, and corrects the expanded factory defect data. The method of generating the factory defect data updated with the post-shipment defect data in the first operation mode is specifically discussed next. If the pixel defect location of the detected defective pixel fails to match the pixel defect location in the pixel defect data stored beforehand in the memory 19, the pixel defect data of the detected defective pixel is added. The pixels at locations (8, 2) and (10, 3) shown in FIGS. 5A and 5B are those defective pixels. If the pixel defect location of the detected defective pixel matches the pixel defect location in the pixel defect data stored beforehand in the memory 19, the defect level of the detected defective pixel is compared with the original defect level. If the defect level of the detected defective pixel is worse than the original defect level, the pixel defect data is updated. The pixels at locations (22, 0) and (2, 6) are those pixels. If the pixel defect location of the detected defective pixel matches the pixel defect location in the pixel defect data stored beforehand in the memory 19, and if the defect level of the detected defective pixel matches the original defect level, no pixel defect data is updated. The pixels at locations (5, 1), (13, 7), and (17, 10) shown in FIGS. 5A and 5B are those pixels. If the original defect level is worse than the defect level of the detected defective pixel, the original defect data is not updated. If any defective pixel in the pixel defect data stored in the memory 19 is not detected, the pixel defect data is not updated. The pixels at locations (2, 11) and (8, 12) shown in FIGS. 5A and 5B are those pixels.

Figure 9:
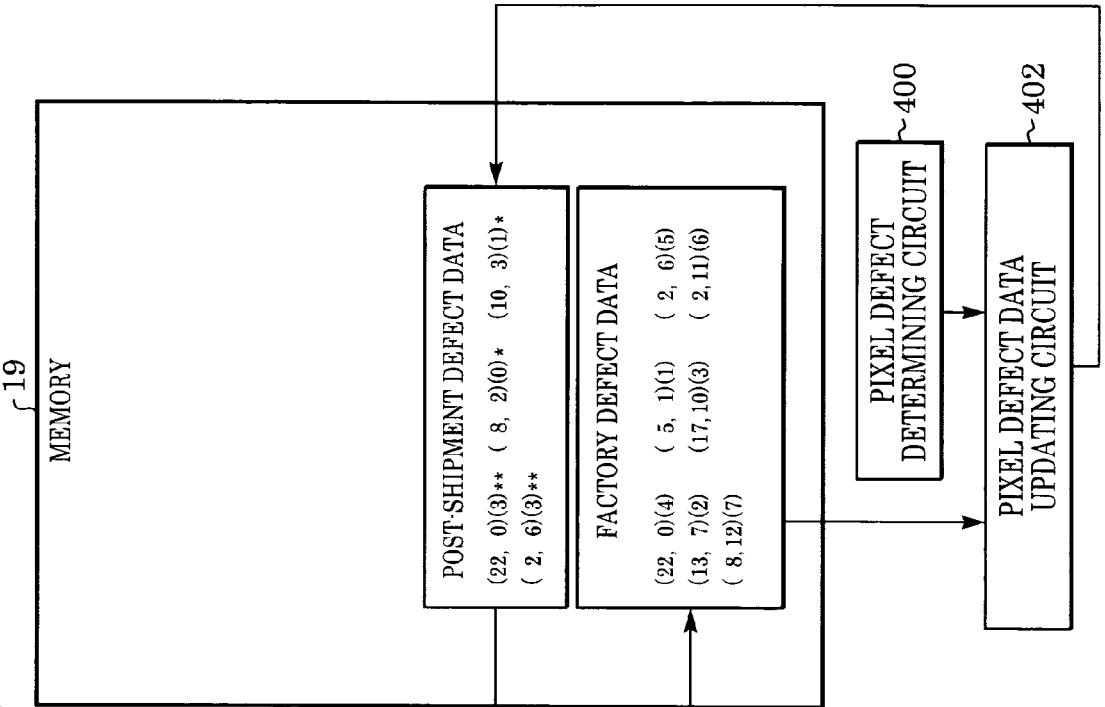
FIG. 9 illustrates the state of the non-volatile memory and the memory in accordance with the second embodiment of the present invention.
Figure 9:
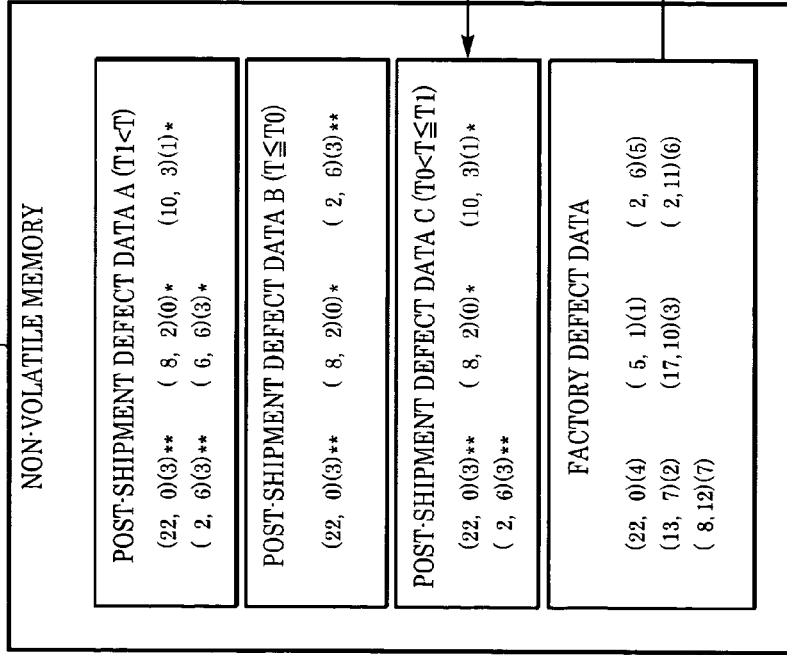

The present invention is not limited to the above method. The pixel defect corrector 17 can correct the defective pixel of the factory defect data beforehand, and the pixel defect determining circuit 400 can detect the post-shipment defect data only. The present invention is not limited to the data structure of FIG. 8. As shown in FIG. 9, the post-shipment defect data can be stored in separate areas of a non-volatile memory (e.g., an area A for a temperature range of T1<T, an area B for a temperature range of T≦T0, an area C for a temperature range of T0<T≦T1) depending on the temperature (T) at the detection.

The post-shipment defect data is stored in the non-volatile memory 56 in step S106. The present invention is not limited to this sequence. Alternatively, whether to store the post-shipment defect data in the non-volatile memory 56 is determined depending on the state of the detected pixel defect data. For example, the post-shipment defect data can be stored in the non-volatile memory 56 only when a total count of pixel defect data of defective pixels equal to or worse than defect level 3 is above a predetermined rated number, for example, 3. More specifically, "Ni" represents a total count of pixel defect data at a defect level "i", a storage and determination range of defect level is 0 to m, and Nth is a predetermined rated number. The post-shipment defect data is stored in the non-volatile memory 56 only when the following condition is satisfied:

$$\Sigma = (N0 + N1 + \ldots + Nm) > Nth \quad (1)$$

For example, if this rule is applied to FIG. 9, Σ=5 for the post-shipment defect data A, Σ=3 for the post-shipment defect data B, and Σ=4 for the post-shipment defect data C. The post-shipment defect data B fails to satisfy the condition Σ>Nth, and is not stored (m=3 and Nth=3).

In accordance with the second embodiment of the present invention, the post-shipment defect data only is stored, and the memory space of the non-volatile memory 56 is conserved. As for a defective pixel that has been further degraded in defect level since the shipment, the pixel defect data as the post-shipment defect data is stored at the same defective pixel address and is updated with the worse defect level. Thus, a correction operation is appropriately performed.

In accordance with the second embodiment of the present invention, the post-shipment defect data is stored in the non-volatile memory 56 by temperature range. Even if the temperature is different from detection to detection, the appropriate post-shipment defect data is expanded from the non-volatile memory 56 to the memory 19 during correction. The correction operation is thus appropriately performed.

In accordance with the second embodiment of the present invention, whether to store the post-shipment defect data in the non-volatile memory 56 is determined depending on the result of the detected data. The memory area of the non-volatile memory 56 is thus conserved.

Third Embodiment

Figure 11:
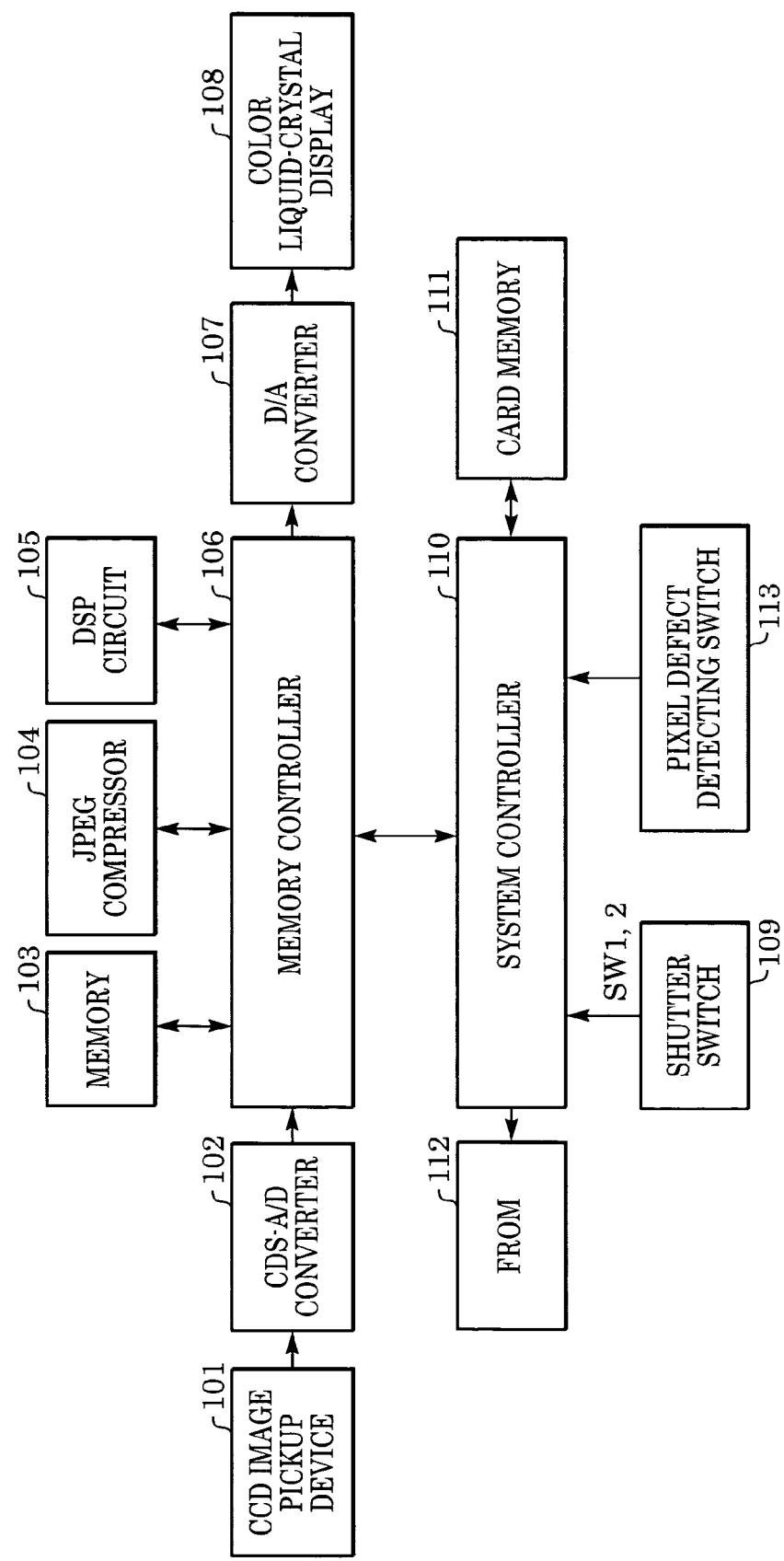
FIG. 11 is a block diagram illustrating an image pickup device of one embodiment of the present invention.

A third embodiment of the present invention is described below. FIG. 11 is a block diagram of a digital still camera in accordance with the third embodiment of the present invention. The third embodiment is applicable not only to a digital still camera but also to a video camera or the like.

As shown in FIG. 11, the digital still camera includes a CCD image pickup device 101, a CDS-A/D (correlated double sampling analog to digital) converter 102 for analog-to-digital converting an image signal of the CCD image pickup device 101, a memory 103 for temporarily storing an image, a JPEG (Joint Photographic Experts Group) compressor 104 for performing JPEG compression, and a digital signal processing (DSP) circuit 105 for signal processing image data.

Also included in the still camera are a memory controller 106 for controlling memories, a digital-to-analog (D/A) converter 107, a color liquid-crystal display 108, a shutter switch 109, a system controller 110, a card memory 111 for storing a final image, an FROM (flash read-only memory) 112 for storing firmware data, and a pixel defect detecting switch 113 operated to detect a defective pixel.

When a subject is photographed, an optical system (not shown) focuses an image of the subject on the surface of the CCD image pickup device 101. An electrical signal into which the CCD image pickup device 101 photoelectrically converts the subject image is input to the CDS-A/D converter 102 as a CCD output signal. A resulting digital signal is stored onto the memory 103 through the memory controller 106 as one frame of data.

The captured image data in the memory 103 is sent to the DSP circuit 105 through the memory controller 106. The image data is then signal processed by the DSP circuit 105 and is compressed by the JPEG compressor 104. The resulting compressed signal is stored in the card memory 111 through an interface (not shown). A system controller 110 generates a signal for driving a CCD driver (not shown), and controls the memory controller 106.

With an image display switch (not shown) turned on, the A/D converted data is directly input to the DSP circuit 105 without being input to the memory 103. The data, after being signal processed by the DSP circuit 105, is digital-to-analog data converted by a D/A converter 107. The resulting analog signal is output to the color liquid-crystal display 108. The color liquid-crystal display 108 displays the captured image.

When a user selects a pixel defect detecting switch 113, connected to the system controller 110, for detecting a defective pixel, the pixel defect detection process is performed under the control of the system controller 110. The system controller 110 controls the system, for example, automatically pressing the shutter, capturing the output of the CCD image pickup device 101 from the CDS-A/D converter 102, and detecting the signal level of each pixel. As will be discussed later, the system controller 110 detects a defective pixel based on the obtained signal level.

An FROM (non-volatile rewritable memory) connected to the system controller 110 stores the detected pixel defect information.

With the image data stored in the memory 103, the system controller 110 replaces the pixel defect data with interpolation data, of the same color as the defective pixel, at up and down and left and right addresses surrounding the defective pixel based on the pixel defect information stored in the FROM 112, and signal processes the pixel defect data for correction.

FIG. 12 illustrates pixel defect information at the shipment of the image processing apparatus 100. In the example shown in FIG. 12, information at eight locations can be accommodated as the pixel defect information. In the example shown in FIG. 12, information at five locations is stored at shipment. The pixel defect information includes X coordinate, and Y coordinate indicating the defective pixel location in the CCD image pickup device 101 and pixel defect level of the defective pixel (unit of level is in mV). The larger the number, the worse the defect level. The signal level of the CCD image pickup device 101 is used as the defect level, and the worse the defect level, the higher the signal level.

FIG. 13 illustrates the result of a first detection of pixel defect subsequent to the shipment. At the first detection of pixel defect, there are three newly detected defective pixels (denoted as Pixel Nos. 4, 5 and 6). Since the pixels denoted as Pixel Nos. 1, 2, 3, 7, and 8 are already registered as defective pixels, no updating is performed for those pixels. Thus, pixels denoted as Pixel Nos. 4, 5, and 6 are newly registered as indicated by asterisk symbols (*). The newly registered defective pixels are listed higher in order than pixels 7 and 8 because of higher defect level. In this case, originally stored information is not deleted, and the new pixel defect information is added. No defect information is thus missing, and the defective pixels are corrected even under any environmental temperature.

FIG. 14 illustrates the result of a second detection of pixel defect. In the second detection operation, the defective pixel at defect level 3 is detected at a location having an X/Y coordinate X of (900, 700) in addition to the defective pixels of FIG. 13.

The defect level of the defective pixel denoted as pixel No. 4, which has been already detected at the X/Y coordinate location of (250, 150), is raised to a defect level of 7. In this case, the newly detected defect level is registered. As represented by double asterisk symbols (**) in FIG. 14, defect information for the pixel denoted as pixel No. 8 is replaced and the defect level of the defective pixel denoted as pixel No. 4 includes rewritten.

In accordance with the third embodiment, the pixel defect information of a higher defect level is stored. Even if the storage area becomes full, the defective pixels are effectively stored and then corrected. As shown in FIGS. 13 and 14, the pixel defect information is stored in the order from high to low defect level. If the memory area is full, or if all information to be added cannot be stored, the pixel defect information is stored in the order from high to low defect level, and a defective pixel having a higher defect level is thus corrected with higher priority.

The pixel defect information of FIG. 15 includes date of detection of defective pixels. In the example shown, pixel defect information for the defective pixel denoted as pixel No. 2 was registered in January 2001. A pixel defect detection operation was then performed in January 2002 about 1 year after, and another defective pixel, denoted as pixel No. 1, was newly detected (tagged with an asterisk symbol (*)). Since the first defective pixel is newer, the first defective pixel is listed higher in order. In this example, eight pieces of pixel defect information can be accommodated.

The pixel defect information is stored in the order from new to old. Even if the memory area is full, or all additional pixel defect information cannot be added, defective pixels are stored in the order from new to old. The newly detected defective pixel is thus corrected with priority. This is because the newer the detection time, the higher the reliability of the defective pixel.

In the third embodiment of the present invention, the defective pixels are stored according to the detection date rather than the defect level. Alternatively, the defective pixels may be associated with both the detection date and the defect level. In such a case, the order of listing may be from the higher to lower defect level or from newer to older detection date. Alternatively, the user can select the order of listing.

The pixel defect detection is initiated in response to the operation of the pixel defect detecting switch 113. Alternatively, the pixel defect detection is automatically performed by firmware. In such a case, the pixel defect detection is performed periodically, or when the ambient temperature changes by a predetermined temperature range. In the illustrated and described embodiments, the number of pieces of pixel defect information stored in the FROM 112 is eight. Alternatively, more pieces of pixel defect information can be stored.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   a detecting device configured to detect a defect level of a
   defective pixel contained in an image pickup device including a plurality of pixels and output second information relating to the detected defect level;
a memory configured to store first information relating to a stored defect level of the defective pixel in the image pickup device;
a correcting device configured to correct an image signal output from the image pickup device using the first information; and
a pixel defect updating circuit configured to compare the first information to the second information, wherein the pixel defect updating circuit is configured to:
update the first information with the second information, if the detected defect level of the defective pixel as detected by the detecting device is higher than the stored defect level of the defective pixel; and
not update the first information with the second information, if the detected defect level matches the stored defect level, or if the stored defect level is higher than the detected defect level.

2. An image processing apparatus according to claim 1, further comprising:
a synthesizing device configured to synthesize third information relating to a defective pixel contained in the image pickup device based on the first information and the second information;
wherein the synthesizing device is configured to synthesize the third information using one of the first information and the second information, whichever has a higher defect level if information of the same pixel is contained in both the first information and the second information, and the memory is configured to store the third information synthesized in the synthesizing device, as the first information.

3. An image processing apparatus according to claim 2, wherein the second information includes a plurality of pieces of information for each of a plurality of image pickup conditions, and the synthesizing device is configured to synthesize the third information relating to the defective pixel using one of the plurality of pieces of information.

4. An image processing apparatus according to claim 1, further comprising:
a lens configured to focus an image on the image pickup device;
an analog-to-digital converter configured to convert a signal from the image pickup device from analog to digital; and
a record controlling device configured to control a recorder to record a signal output from a correcting device.

5. An image processing apparatus according to claim 1, wherein the detecting device is configured to detect a defective pixel based on a detection parameter comprising temperature.

6. An image processing apparatus according to claim 1, wherein the detecting device is configured to detect a defective pixel based on a detection parameter comprising shutter speed.

7. An image processing apparatus according to claim 1, wherein the detecting device is configured to detect a defective pixel based on a detection parameter comprising effective gain.

8. An image processing method comprising:
detecting a defect level of a defective pixel contained in an image pickup device including a plurality of pixels and outputting second information relating to the detected defect level;
correcting an image signal output from the image pickup device using first information relating to a stored defect level of the defective pixel contained in the image pickup device, the stored defect level being stored in a memory; and
updating pixel defect information by comparing the first information to the second information,
wherein the first information is updated with second information, if the detected defect level of the defected pixel is higher than the stored defect level of the defective pixel, and
wherein the first information is not updated with the second information, if the detected defect level matches the stored defect level, or if the stored defect level is higher than the detected defect level.

9. An image processing method for reading defective pixel information stored in a memory and correcting an image signal output from an image pickup device comprising:
detecting a defect level of a defective pixel located at a defective pixel location in an image pickup device;
reading the defective pixel information stored in the memory;
determining if information for the defective pixel at the defective pixel location is stored in the memory as the defective pixel information;
if the information for the defective pixel at the defective pixel location is not stored in the memory as the defective pixel information, storing the detected defect level of the defective pixel at the defective pixel location in the memory as the detective pixel information;
if the information for the defective pixel at the defective pixel location is stored in the memory as the defective pixel information, determining if the detected defect level of the defective pixel at the defective pixel location is higher than a stored defect level of the defective pixel at the defective pixel location stored in the defective pixel information stored in the memory;
if the detected defect level of the defective pixel at the defective pixel location is higher than the stored defect level of the defective pixel at the defective pixel location stored in the defective pixel information stored in the memory, updating the defective pixel information for the defective pixel at the defective pixel location in the memory with the detected defect level; and
if the detected defect level of the defective pixel at the defective pixel location matches the stored defect level of the defective pixel at the defective pixel location stored in the defective pixel information stored in the memory, or if the stored defect level is higher than the detected defect level, not updating the defective pixel information for the defective pixel at the defective pixel location in the memory with the detected defect level.

* * * * *